United States Patent [19]

Schonlau et al.

[11] Patent Number: 5,042,254
[45] Date of Patent: Aug. 27, 1991

[54] TANDEM MASTER CYLINDER WITH SECOND PISTON ANCHORED AT BOTTOM OF BORE

[75] Inventors: Juergen Schonlau, Walluf; Ralf Harth, Oberursel, both of Fed. Rep. of Germany

[73] Assignee: Alfred Teves GmbH, Frankfurt, Fed. Rep. of Germany

[21] Appl. No.: 317,154

[22] Filed: Feb. 27, 1989

[30] Foreign Application Priority Data

Mar. 2, 1988 [DE] Fed. Rep. of Germany ....... 3806788

[51] Int. Cl.$^5$ .......................... B60T 11/20; F15B 7/08
[52] U.S. Cl. ........................................ 60/562; 60/589; 60/591
[58] Field of Search ............... 60/562, 585, 589, 591, 60/592

[56] References Cited

U.S. PATENT DOCUMENTS

| 3,143,860 | 8/1964 | Stelzer | 60/562 |
| 3,232,058 | 2/1966 | Ayers | 60/562 |
| 4,598,955 | 7/1986 | Belart et al. | 60/562 X |
| 4,621,498 | 11/1986 | Schaefer | 60/589 X |
| 4,885,910 | 12/1989 | Resch | 60/589 X |
| 4,922,120 | 5/1990 | Becker et al. | 60/562 X |

FOREIGN PATENT DOCUMENTS

| 1249106 | 8/1967 | Fed. Rep. of Germany | 60/562 |
| 1530530 | 2/1970 | Fed. Rep. of Germany | 60/62 |
| 3717706 | 12/1988 | Fed. Rep. of Germany | . |
| 0488771 | 7/1938 | United Kingdom | 60/562 |
| 2098687 | 11/1982 | United Kingdom | 60/562 |

Primary Examiner—Edward K. Look
Assistant Examiner—John Ryznic
Attorney, Agent, or Firm—Robert P. Seitter; J. Gordon Lewis

[57] ABSTRACT

In order to shorten the overall axial length of a dual piston tandem master cylinder for hydraulic brake systems, the second piston thereof is anchored on the bottom of the longitudinal bore and the first piston is anchored on the second piston.

19 Claims, 1 Drawing Sheet

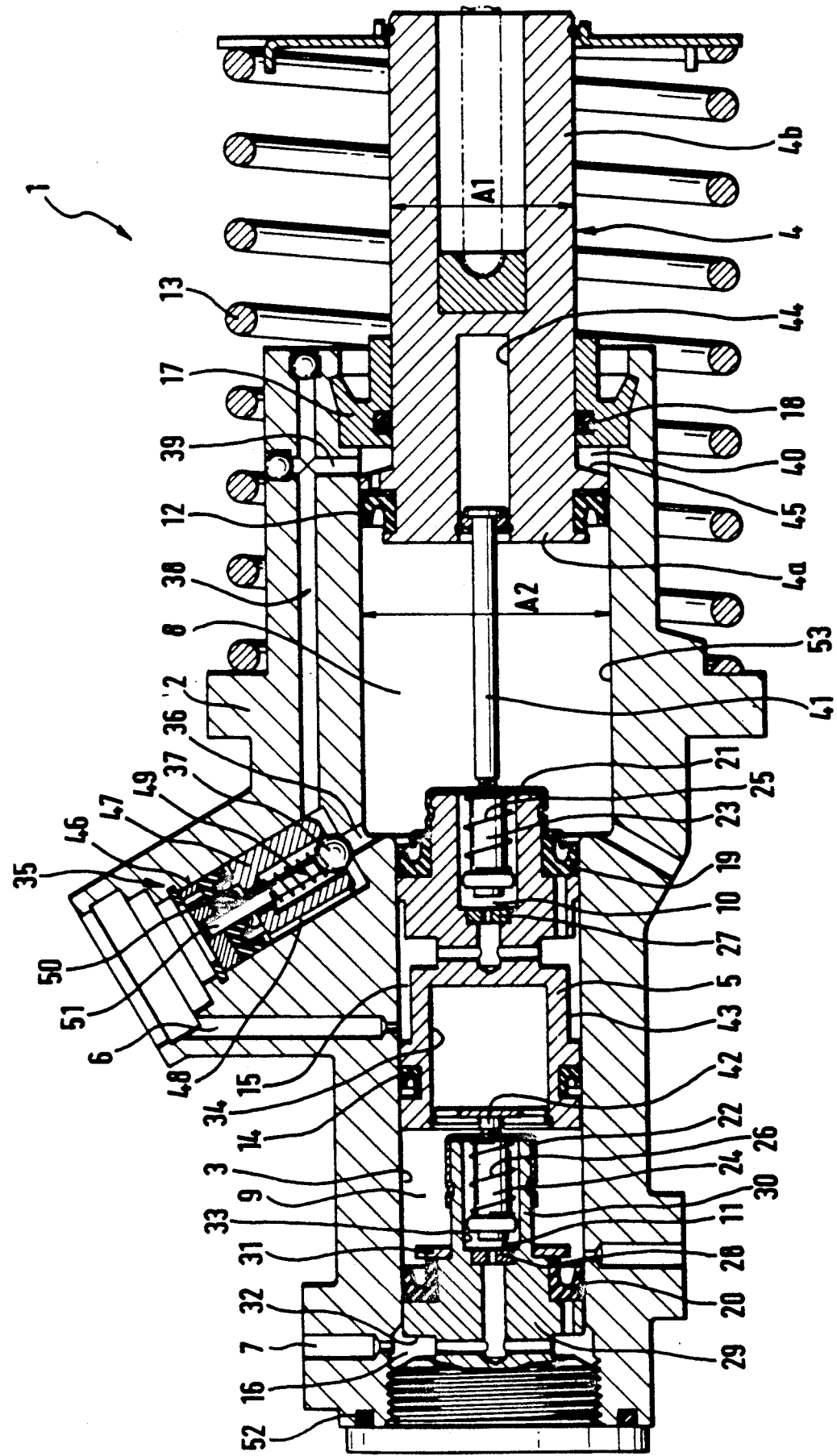

TANDEM MASTER CYLINDER WITH SECOND PISTON ANCHORED AT BOTTOM OF BORE

BACKGROUND OF THE INVENTION

The present invention relates to a tandem master cylinder for hydraulic brake systems of automotive vehicles, comprising a housing in whose longitudinal bore a first and a second piston are sealedly slidably guided and confine a first and a second pressure chamber which are in communication with a supply reservoir by two central valves which open in their release position. A resetting spring is provided which preloads the first piston and is arranged outside of the longitudinal bore. The first central valve is placed in the second piston and the second central valve is arranged at the end of the longitudinal bore separately of the second piston.

A tandem master cylinder of this type is disclosed in German patent application P 37 17 706.0. A particular characteristic of this tandem master cylinder, which is preferably used on slip-controlled brake systems and the central valves of which are designed as regulating valves, is that the two working pistons (primary and secondary pistons) are separated from each other and cooperate with stationary stops, with the first central regulating valve being placed in the secondary piston and the second central valve being arranged at the end of the longitudinal bore of the master cylinder housing separately of the secondary piston.

It is a shortcoming in this known tandem master cylinder that the axial length of the second (secondary) pressure chamber must be dimensioned so as to allow the accommodation of a piston-resetting spring. Therefore a short tandem master cylinder construction is not possible.

SUMMARY OF THE INVENTION

Therefore, it is an object of the present invention to provide a tandem master cylinder of the type referred to, the overall axial length of which can be shortened while its reliability of operation is maintained.

This object is achieved in that the second piston is anchored on the bottom of the longitudinal bore and the first piston is anchored on the second piston. This arrangement deletes both the resetting spring arranged in the second pressure chamber and the two stops of known devices. Thus, the overall axial length is reduced considerably. In a preferred embodiment, the second piston advantageously is anchored by means of a valve member which contains the second central valve and which is preferably designed as a threaded plug closing the longitudinal bore. For this purpose, the second piston is anchored on the valve member by means of a second retaining tube, on which a closure member of the second central valve is axially supported in the release position. This closure member is actuatable by a second actuating element retained in the second piston.

In a favorable improvement of the the present invention, the first piston is anchored on the second piston by means of a first retaining tube, against which a closure member of the first central valve bears axially in the release position, which member is actuatable by a first actuating element retained in the first piston. A particularly low cost design of the inventive tandem master cylinder is achieved in that the first piston is designed as a plunger piston.

It is also possible to provide the first pressure chamber as a filling chamber that is hydraulically biased by means of a differential pressure valve, and the first piston is provided as a stepped piston, with an annular chamber that is confined by a step of the first piston and by the wall of the first pressure chamber being applicable with the hydraulic differential pressure biassing the filling chamber. Owing to this arrangement, the mode of function of the tandem master cylinder in accordance with the present invention is essentially improved and/or the response time of the hydraulic brake system is considerably shortened.

BRIEF DESCRIPTION OF THE DRAWING

Further features, advantages and applications of this invention can be taken from the following detailed description of an embodiment with reference to the accompanying drawing, the single FIGURE of which illustrates a tandem master cylinder, in accordance with the present invention, in cross section.

DETAILED DESCRIPTION OF A PREFERRED EMBODIMENT

The tandem master cylinder 1 shown in the drawing and preferably provided as a fast-fill master cylinder 1 comprises a housing 2 in whose longitudinal bore 3 a first piston 4 and a second piston 5 are axially slidably arranged and confine together with the bore wall a first pressure chamber 8 and a second pressure chamber 9. The two pressure chambers 8 and 9 are in communication with a supply reservoir (not shown) by way of central valves 10, 11 which open in the release position of the tandem master cylinder 1 and by way of two supply chambers 15, 16 and supply channels 6, 7. The arrangement of the central valves 10, 11 is preferably chosen such that the first central valve 10 is disposed in the second piston 5 and the second central valve 11 is placed in a valve member 29 provided on the bottom of the longitudinal bore 3. In the embodiment shown, the valve member 29 is formed by a threaded plug which is sealed relative to the second pressure chamber 9 by virtue of a ring seal 52.

In its area adjacent to the second supply channel 7, the valve member 29 is furnished with a radial recess 32 which, together with the wall of the longitudinal bore 3, bounds the second supply chamber 16 which is isolated from the second pressure chamber 9 by a second overflow sleeve 20 which is held axially by means of a retaining disc 31 slid onto an axial extension 30 of the valve member 29. The axial extension 30 contains an axial bore 33 which receives a closure member 24 of the second central valve 11, which closure member cooperates with a valve seat 28 arranged at the end of the bore 33.

In this arrangement, the closure member 24 which is biased in the closing direction by means of a valve spring 26 takes support on a second retaining tube 22 which is positively connected with the axial extension 30. The second piston 5 provided with a second sealing sleeve 14 comprises an axial recess 34, the diameter of which corresponds roughly to that one of the second retaining tube 22 and the length of which corresponds to the stroke of the second piston 5. This recess 34 receives a second actuating element 42 of the second central valve 11 which, in conjunction with the second retaining tube 22 and the valve member 29, serves to anchor the second piston 5 on the bottom of the longitudinal bore 3.

In its area adjacent to the first supply channel 6, the second piston 5 is provided with a radial recess 43 which, together with the wall of longitudinal bore 3, confines the first supply chamber 15 of the first pressure chamber 8. The connection between the two chambers 15, 8 is constituted by the central valve 10 accommodated in the second piston 5, the valve closure member 23 cooperating with a valve seat 27 and preloaded by a valve spring 25 moving into abutment on a first retaining tube 21 attached to the second piston 5 in positive engagement therewith and, in conjunction with its actuating element 41, ensuring anchoring of the first piston 4 on the second piston 5. For this purpose, the first piston 4 includes an axial recess 44 in which the actuating element 41 is held. The separation of the first supply chamber 15 from the first pressure chamber 8 is carried out by a first overflow sleeve 19 which is axially held on the second piston 5 by the first retaining tube 21.

The first pressure chamber 8 designed as filling chamber in the embodiment shown is disposed in a larger-diameter portion 53 of the longitudinal bore 3, while the first piston 4 designed as a stepped piston includes a front part 4a guided in portion 53, the diameter A2 being substantially larger than the diameter A1 of the rear piston part 4b which acts as a plunger piston and which is guided in a closing element 17 closing the longitudinal bore 3 and is sealed by a ring seal 18. Provided between the two parts 4a, b of the first piston 4 is a radial step 45 which bounds in the bore portion 53 an annular chamber 40 which is isolated from the first pressure chamber 8 (filling chamber) by virtue of a sealing sleeve 12 arranged on the front part 4a of piston 4. Bearing against the housing 2 is a resetting spring 13 which, in the release position, preloads the two pistons 4, 5 to the right, as viewed in the drawing.

Terminating into the first pressure chamber 8 (filling chamber) is a pressure fluid passage 36 which communicates by way of channels 38, 39 with the previously described annular chamber 40. The connection between the pressure fluid passage 36 and the first channel 38 is adapted to be closed and/or opened by virtue of a differential pressure valve 35, and as a function of the hydraulic pressure prevailing in the filling chamber.

The differential pressure valve 35 is, integrated in the housing 2 of the tandem master cylinder 1, contained in a housing bore 46 that communicates with the first supply channel 6. This valve is preferably formed by a valve sleeve 47 whose axial ribs in the housing bore 46 (not illustrated) more closely confine pressure fluid ducts 48. At its end remote from the pressure fluid passage 36, the valve sleeve 47 is sealed by means of a sealing sleeve 50, through which a pin 51 is extending which cooperates with a ball 37 serving as a closure member and being biassed towards the pressure fluid passage 36 by means of a closure spring 49 that bears against the valve sleeve 47.

When the first (stepped) piston 4 is actuated, its front part 4a of larger diameter A2 supplies pressure fluid volume into the brake circuit connected to the first pressure chamber 8 and, via the second piston 5, into the brake circuit connected to the second pressure chamber 9. Upon rise of the hydraulic pressure prevailing in the filling chamber 8 in excess of the so-called disconnecting pressure of the differential pressure valve 35, pressure fluid volume is delivered through the now opened differential pressure valve 35 into the annular chamber 40 which previously (during a resetting movement of the first piston 4) was supplied with pressure fluid out of the supply reservoir (not shown) by way of the sealing sleeve 50. Pressure build-up in the first pressure chamber 8 causes rapid opening and closing of the differential pressure valve 35 so that pressure development in the annular chamber 40 will not take place abruptly, but, instead, in a regulated manner. After the filling stage is de-activated by the differential pressure valve 35, the useful volume is delivered through the rear part 4b of the stepped piston 4 of smaller diameter A1.

What is claimed is:

1. A tandem master cylinder for the hydraulic brake system of an automotive vehicle, comprising: a housing in whose longitudinal bore a first and a second piston are sealedly slidably guided and confine a first and a second pressure chamber which are in communication with a supply reservoir by virtue of two central valves which open in the release position, a resetting spring which preloads the first piston and is arranged outside of the longitudinal bore and the first central valve being placed in the second piston and the second central valve being arranged at the end of the longitudinal bore separately of the second piston, wherein the second piston is anchored on the bottom of the longitudinal bore and the first piston is anchored by a retaining tube on the second piston.

2. The tandem master cylinder as claimed in claim 1, wherein said pistons are positively anchored.

3. The tandem master cylinder as claimed in claim 2, wherein the second piston is anchored by means of a valve member which contains the second central valve.

4. A tandem master cylinder for the hydraulic brake system of an automotive vehicle, comprising: a housing in whose longitudinal bore a first and a second piston are sealedly slidably guided and confine a first and a second pressure chamber which are in communication with a supply reservoir by virtue of two central valves which open in the release position, wherein said first piston is provided as a plunger piston a resetting spring which preloads the first piston and is arranged outside of the longitudinal bore and the first central valve being placed in the second piston and the second central valve being arranged at the end of the longitudinal bore separately of the second piston, wherein the second piston is anchored on the bottom of the longitudinal bore and the first piston is anchored on the second piston, wherein said pistons are positively anchored, wherein the second piston is anchored by means of a valve member which contains the second central valve, and, wherein the valve member is designed as a threaded plug closing the longitudinal bore.

5. The tandem master cylinder as claimed in claim 4, wherein the second piston is anchored on the valve member by means of a second retaining tube, on which a closure member of the second central valve is axially supported in the release position, which closure member is actuatable by a second actuating element retained in the second piston.

6. The tandem master cylinder as claimed in claim 5, wherein the valve member is furnished with a cylindrical axial extension, in the bore of which the closure member of the second central valve is guided and biassed by means of a second valve spring which takes support on the second retaining tube.

7. The tandem master cylinder as claimed in claim 6, wherein the valve member is furnished with a radial recess which, together with the wall of the longitudinal bore, confines a supply chamber of the second pressure chamber.

8. The tandem master cylinder as claimed in claim 7, wherein the supply chamber is sealed in relation to the second pressure chamber by means of an overflow sleeve which is axially held by a retaining disc slid onto the axial extension.

9. A tandem master cylinder for the hydraulic brake system of an automotive vehicle, comprising: a housing in whose longitudinal bore a first and a second piston are sealedly slidably guided and confine a first and a second pressure chamber which are in communication with a supply reservoir by virtue of two central valves which open in the release position, a resetting spring which preloads the first piston and is arranged outside of the longitudinal bore and the first central valve being placed in the second piston and the second central valve being arranged at the end of the longitudinal bore separately of the second piston, wherein the second piston is anchored on the bottom of the longitudinal bore and the first piston is anchored on the second piston, wherein said pistons are positively anchored, wherein the second piston is anchored by means of a valve member which contains the second central valve, and, wherein the valve member is designed as a threaded plug closing the longitudinal bore, wherein the second piston is anchored on the valve member by means of a second retaining tube, on which a closure member of the second central valve is axially supported in the release position, which closure member is actuatable by a second actuating element retained in the second piston, wherein the valve member is furnished with a cylindrical axial extension, in the bore of which the closure member of the second central valve is guided and biased by means of a second valve spring which takes support on the second retaining tube, wherein the valve member is furnished with a radial recess which, together with the wall of the longitudinal bore, confines a supply chamber of the second pressure chamber, wherein the supply chamber is sealed in relation to the second pressure chamber by means of an overflow sleeve which is axially held by a retaining disc slid onto the axial extension, and wherein the second piston comprises an axial recess, the diameter of which approximately corresponds to that one of the second retaining tube and the length of which corresponds to the stroke of the second piston.

10. A tandem master cylinder for the hydraulic brake system of an automotive vehicle, comprising: a housing in whose longitudinal bore a first and a second piston are sealedly slidably guided and confine a first and a second pressure chamber which are in communication with a supply reservoir by virtue of two central valves which open in the release position, a resetting spring which preloads the first piston and is arranged outside of the longitudinal bore and the first central valve being placed in the second piston and the second central valve being arranged at the end of the longitudinal bore separately of the second piston, wherein the second piston is anchored on the bottom of the longitudinal bore and the first piston is anchored on the second piston, and, wherein the first piston is anchored by means of a first retaining tube, against which a closure member of the first central valve is bearing axially in the release position, which latter closure member is actuatable by a first actuating element retained in the first position and wherein said first pressure chamber provides a filling chamber hydraulically biased by a differential pressure valve.

11. The tandem master cylinder as claimed in claim 10, wherein the closure member of the first central valve is biassed in the closing direction by means of a first valve spring which takes support on the first retaining tube.

12. The tandem master cylinder as claimed in claim 11, wherein the second piston is provided with a radial recess which, together with the wall of longitudinal bore, confines a supply chamber of the first pressure chamber.

13. The tandem master cylinder as claimed in claim 12, wherein the supply chamber is sealed in relation to the first pressure chamber by means of an overflow sleeve which is axially held by the first retaining tube 21.

14. The tandem master cylinder as claimed in claim 13, wherein the first piston includes an axial recess whose diameter corresponds roughly to that one of the first actuating element and whose length corresponds to the stroke of first piston.

15. The tandem master cylinder as claimed in claim 14, wherein the first piston is designed as a plunger piston.

16. A tandem master cylinder for the hydraulic brake system of an automotive vehicle, comprising: a housing in whose longitudinal bore a first and a second piston are sealedly slidably guided and confine a first and a second pressure chamber which are in communication with a supply reservoir by virtue of two central valves which open in the release position, a resetting spring which preloads the first piston and is arranged outside of the longitudinal bore and the first central valve being placed in the second piston and the second central valve being arranged at the end of the longitudinal bore separately of the second piston, wherein the second piston is anchored on the bottom of the longitudinal bore and the first piston is anchored on the second piston, and, wherein the first piston is anchored by means of a first retaining tube, against which a closure member of the first central valve is bearing axially in the release position, which latter closure member is actuatable by a first actuating element retained in the first position, wherein the closure member of the first central valve is biassed in the closing direction by means of a first valve spring which takes support on the first retaining tube, wherein the second piston is provided with a radial recess which, together with the wall of longitudinal bore, confines a supply chamber of the first pressure chamber, wherein the supply chamber is sealed in relation to the first pressure chamber by means of an overflow sleeve which is axially held by the first retaining tube 21, wherein the first piston includes an axial recess whose diameter corresponds roughly to that one of the first actuating element and whose length corresponds to the stroke of first piston, wherein the first piston is designed as a plunger piston, and wherein the first pressure chamber is designed as a filling chamber that is hydraulically biassed by means of a differential pressure valve, and the first piston is designed as a stepped piston, with an annular chamber that is confined by a step of the first piston and by the wall of the first pressure chamber being applicable with the hydraulic differential pressure biassing the filling chamber.

17. The tandem master cylinder as claimed in claim 16, wherein terminating into the filling chamber (first pressure chamber) is a pressure fluid passage which is adapted to be closed by the differential pressure valve and to which channels are connected that lead to the annular chamber.

18. The tandem master cylinder as claimed in claim 17, wherein the differential pressure valve is integrated in the housing.

19. The tandem master cylinder as claimed in claim 18, wherein the differential pressure valve is arranged in a housing bore connected with a first supply channel and is formed by a valve sleeve which, together with the housing bore, confines pressure fluid ducts and guides a ball which serves as a closure member, which is biassed by a closure spring and cooperates with a pin that is sealed in relation to the housing bore by means of a sealing sleeve.

* * * * *